US010316596B2

(12) United States Patent
Odru et al.

(10) Patent No.: US 10,316,596 B2
(45) Date of Patent: Jun. 11, 2019

(54) ELECTRIC LINEAR ACTUATION SYSTEM EQUIPPED WITH ENERGY STORAGE

(71) Applicant: IFP Energies nouvelles, Rueil-Malmaison (FR)

(72) Inventors: Pierre Odru, Montreuil (FR); Michel Constant, Montmorency (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 51 days.

(21) Appl. No.: 15/532,868

(22) PCT Filed: Nov. 10, 2015

(86) PCT No.: PCT/EP2015/076239
§ 371 (c)(1),
(2) Date: Jun. 2, 2017

(87) PCT Pub. No.: WO2016/087171
PCT Pub. Date: Jun. 9, 2016

(65) Prior Publication Data
US 2018/0266195 A1    Sep. 20, 2018

(30) Foreign Application Priority Data

Dec. 3, 2014    (FR) ........................... 14 61844

(51) Int. Cl.
*H02J 7/00*        (2006.01)
*H02J 7/34*        (2006.01)
(Continued)

(52) U.S. Cl.
CPC ........ *E21B 19/006* (2013.01); *B63B 35/4413* (2013.01); *B66C 13/02* (2013.01);
(Continued)

(58) Field of Classification Search
CPC ........ E21B 19/006; E21B 19/09; E21B 19/06; E21B 19/163; E21B 19/161;
(Continued)

(56) References Cited

U.S. PATENT DOCUMENTS 3,549,129 A * 12/1970 Graham .................. B63B 21/56
114/245
4,211,125 A *  7/1980 Benton ............... F16H 25/2219
74/424.82
(Continued)

FOREIGN PATENT DOCUMENTS

EP    0363158 A2 *  4/1990    ............. B60G 15/10
EP    0363158 A2      4/1990
(Continued)

OTHER PUBLICATIONS

International Publication for PCT/EP2015/076239 dated Feb. 10, 2016; English translation submitted herewith (7 pages).

*Primary Examiner* — James G Sayre
(74) *Attorney, Agent, or Firm* — Fitch, Even, Tabin & Flannery LLP

(57) ABSTRACT

The present invention is a linear actuation system comprising a reversible screw type linear actuator, equipped with at least one reversible electrical motor system and energy storage. The energy storage is charged by linear actuation system functioning as a generator when a mobile rod of the linear actuator is moved by heave and is discharged when the mobile rod is moved by activation of an electric motor of the linear actuation system motor.

19 Claims, 2 Drawing Sheets

(51) Int. Cl.
*H02K 7/02* (2006.01)
*H02K 7/06* (2006.01)
*B63B 35/44* (2006.01)
*B66C 13/02* (2006.01)
*E21B 19/00* (2006.01)
*E21B 19/09* (2006.01)
*F16H 23/00* (2006.01)
*H02K 16/00* (2006.01)

(52) U.S. Cl.
CPC ............. *E21B 19/09* (2013.01); *F16H 23/00* (2013.01); *H02J 7/0068* (2013.01); *H02K 7/02* (2013.01); *H02K 7/025* (2013.01); *H02K 7/06* (2013.01); *H02J 7/345* (2013.01); *H02K 16/00* (2013.01); *Y02E 60/16* (2013.01)

(58) Field of Classification Search
CPC .... E21B 19/155; E21B 19/164; H02J 7/0068; H02J 7/345; H02K 7/025; H02K 7/06
See application file for complete search history.

(56) References Cited

U.S. PATENT DOCUMENTS

| | | | |
|---|---|---|---|
| 4,962,817 A * | 10/1990 | Jones | E21B 19/09 166/355 |
| 5,520,369 A | 5/1996 | Chatard | |
| 7,923,946 B2 * | 4/2011 | Williams | E21B 19/006 318/150 |
| 2009/0251258 A1 * | 10/2009 | Rhinefrank | F03B 13/20 335/306 |
| 2010/0314168 A1 | 12/2010 | Williams | |
| 2014/0014015 A1 * | 1/2014 | Roodenburg | B63B 39/00 114/124 |

FOREIGN PATENT DOCUMENTS

| | | | | |
|---|---|---|---|---|
| EP | 1927543 | A2 | 6/2008 | |
| EP | 2385608 | A2 | 11/2011 | |
| EP | 2445080 | A1 | 4/2012 | |
| EP | 2232101 | B1 | 12/2012 | |
| FR | 2218273 | A1 | 9/1974 | |
| FR | 2575452 | A1 | 7/1986 | |
| GB | 2347127 | A * | 8/2000 | ............ B60G 13/14 |
| JP | 2001-163574 | A | 6/2001 | |
| WO | 2008/102166 | A1 | 8/2008 | |
| WO | 2009/156953 | A1 | 12/2009 | |
| WO | 2014/094778 | A1 | 6/2014 | |
| WO | WO-2016062437 | A1 * | 4/2016 | ............ B63B 27/30 |

* cited by examiner

ELECTRIC LINEAR ACTUATION SYSTEM EQUIPPED WITH ENERGY STORAGE

CROSS REFERENCE TO RELATED APPLICATIONS

Reference is made to International Patent Application No. PCT/EP2015/076239 filed Nov. 10, 2015, and French Patent Application No. 14/61.844, filed Dec. 3, 2014, which applications are incorporated herein by reference in their entirety.

FIELD OF THE INVENTION

The present invention relates to electromechanical systems for generating linear motion which use oleopneumatic energy systems. The present invention also relates to the field of heave compensators for offshore drill pipe laying.

BACKGROUND OF THE INVENTION

Description of the Prior Art

A hydraulic cylinder generally has a rod longitudinally guided in a cylinder. The motion is made possible by a sealed section secured to the rod, within the cylinder body and provided with a seal. Oil under pressure allows an eternal load secured to the rod to be moved by creating a force on the sealed section.

The hydraulic cylinder can be actively controlled by adjusting directly at least one of the pressure and the amount of oil injected, or through a more sophisticated control system for example using a servovalve. The cylinder can also be passively used for accompanying a motion of a load with a weakly variable force. The oil under pressure is then communicated with an air reserve that is compressed or expanded under the effect of the oil volume variations related to the motions of the cylinder rod, by slightly modifying the initial pressure thereof. However, in the absence of an infinite reserve, this compression is accompanied with a residual force variation.

These systems are very widely used, notably in the offshore petroleum industry. They however have the disadvantage of being heavy, bulky, requiring significant circulation of fluids under pressure, having oil leaking problems and an efficiency that is not optimal.

In order to overcome these drawbacks, in many industries and notably in the aircraft industry, hydraulic systems are replaced by electrified systems. For example, electromechanical actuators such as those described in patent applications EP-1,927,543 and EP-2,232,101 can be used. The general principle of electromechanical actuators is to provide linear motion of an element (generally a rod) powered by an electrical motor. These electromechanical actuators can be classified into two families:
- indirect-drive actuators requiring a mechanical transmission and conversion device between the rotary actuator and its load in translation. This drive mode is the most widely used because it is generally less costly and it is satisfactory in most applications;
- direct-drive actuators which simplify the transmission chain by removing the intermediate member (conversion of a rotary motion to a linear motion). In this case, the devices are real electromagnetic linear actuators.

However, electromagnetic actuators consume electrical energy from an electrical energy source, often a power distribution network, which makes it difficult to use them, notably for offshore use.

SUMMARY OF THE INVENTION

In order to overcome these drawbacks, the present invention relates to a linear actuation system comprising a screw type reversible linear actuator which is equipped with at least one reversible electrical motor system and one energy storage. The energy storage means are charged by the linear actuation system acting as a generator and is discharged on demand into the electrical motor. Thus, the overall size of the actuation system according to the invention is reduced in relation to a hydraulic actuation system and the power consumption of the linear actuation system is reduced by the energy storage.

The invention relates to a linear actuation system comprising a mobile rod connected to a screw type reversible linear actuator. The linear actuator is driven by at least one electrical motor system. The linear actuation system comprises at least one energy storage connected to the electrical motor system. The electrical motor system operates as a generator for charging the energy storage when motion is applied to the rod and as a motor for generating a rectilinear translational motion of the rod.

According to the invention, the linear actuator is a screw-nut type device comprising a plurality of rollers or balls driven by the electric motor, with the p rollers or balls driving a threaded rod of the linear actuator.

Advantageously, the threaded rod of the actuator comprises a thread of triangular, trapezoidal or ovoid type.

According to one aspect of the invention, the energy storage comprises at least one electrical energy storage, comprising notably at least one of an electrical battery and at least one supercapacitor.

According to a feature of the invention, the energy storage comprises at least one mechanical energy storage which notably is at least one flywheel.

According to an embodiment of the invention, the linear actuation system comprises a controller of the electrical motor system.

Preferably, the electrical motor system is supplied by the energy storage.

Advantageously, the linear actuation system is connected to a power distribution network.

According to a variant embodiment of the invention, the electrical motor system is supplied by the power distribution network when the energy storage is discharged or is not able to supply energy to the electrical motor system.

Advantageously, the electrical motor system supplies electrical energy into the power distribution network when the electrical motor system operates as a generator and when the energy storage is charged.

Furthermore, the invention relates to a heave compensator for drill bits fastened to a mobile unit. The heave compensator comprises at least one linear actuation system according to the invention for maintaining a constant tension on the drill bits.

According to the invention, the compensator comprises a first block and a second block for hanging the drill bits. The first block is connected to the mobile unit by at least two articulated arms with each articulated arm comprising at least one sheave. The heave compensator comprises a cable attached to a retainer, which runs through the sheaves of the articulated arms and through the first and second blocks. The heave compensator comprises at least one linear actuation system connected to the first block and to the mobile unit.

Preferably, the mobile unit is a floating support or a ship.

The invention also relates to a use of the linear actuation system according to the invention for a tensioning system for vertical pipes arranged between the sea bottom and a mobile unit.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

The present invention relates to a linear actuation system that generates a linear rectilinear translational motion. The linear actuation system according to the invention comprises:
a rod having a rectilinear translational motion;
a screw type linear actuator of, for example of thread or ball type, and notably of satellite type, which reversibly converts a rotary motion to a translational motion, with the screw of the linear actuator corresponding to the rod of the system or being attached to the rod of the system;
at least one electrical motor system that can operate as a motor by generating a rotary motion from an electrical current and as a generator by supplying an electrical current from a rotary motion, the electrical motor system driving the linear actuator and conversely, the electrical motor system can be, depending on the application, a motor/generator integrated in a single body or, alternatively, a separate motor and separate generator; and
at least one energy storage connected to the electrical motor, which stores the energy generated when the motor operates as a generator and supplies energy when the motor operates as a motor.

Thus, when the system wants to generate a translational motion, the energy storage or another energy source supplies energy to the electrical motor that drives the linear actuator, which generates a rectilinear translational motion of the rod. Conversely, when a translational motion is imposed on the rod, the linear actuator generates a rotary motion that is converted to energy by the electrical motor operating as a generator with the generated electrical energy being stored in the energy storage.

Figure 1:
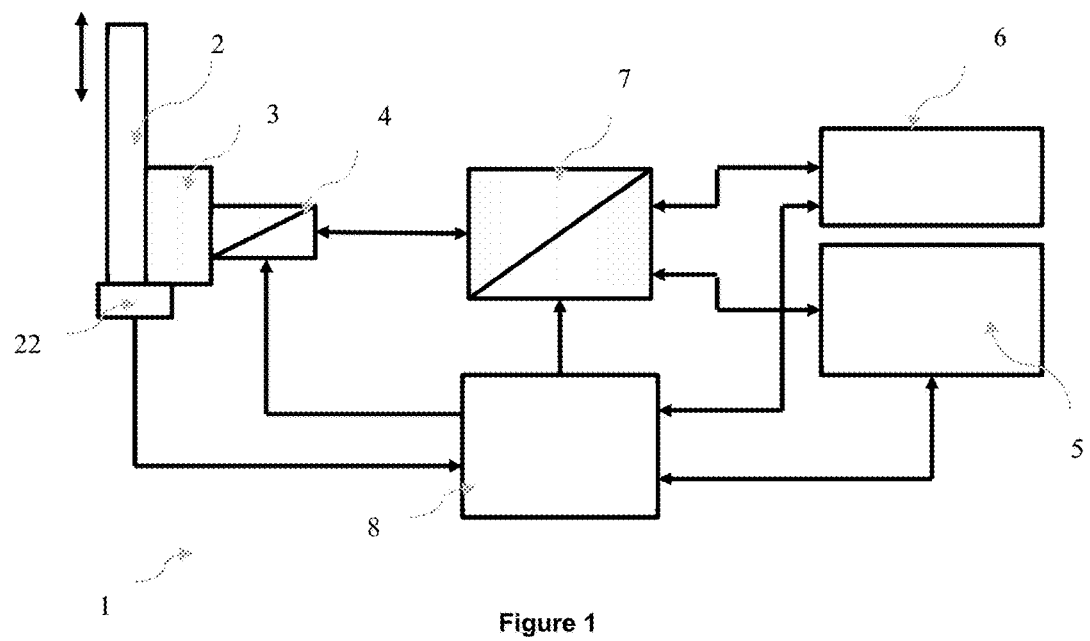
FIG. 1 illustrates a linear actuation system according to the invention.

FIG. 1 illustrates a linear actuation system according to the invention. Linear actuation system 1 comprises a rod 2, a mechanical actuator 3 provided with a mechanical reducer, at least one electrical motor 4 and energy storage 5. The axis of linear actuator 3 corresponds to rod 2. Electrical motor 4 is a motor/generator (alternatively, it can be a separate motor and generator). Energy storage 5 is connected to electrical motor 4, notably through a power electronic device 7. As shown, and optionally, electrical motor 4 is also connected to a system managing power distribution network 6, notably through the power electronic device 7. Electrical motor 4, energy storage 5 and optionally the system managing power distribution network 6 can be controlled by an electronic control unit 8, for supplying electrical motor 4 with electrical energy when it operates as a motor and for collecting the energy provided by electrical motor 4 when operating as an electrical generator in order to store electrical energy in energy storage 5 or to redistribute it to power distribution network 6. Furthermore, according to the example illustrated in FIG. 1, electronic control unit 8 can receive a signal from a sensor 22 positioned on rod 2. Sensor 22 can notably be a position sensor.

According to an aspect of the invention, the linear actuator is an indirect-drive actuator. Indeed, the performance of indirect-drive actuators is well suited to the conventional operating constraints of this type of system, notably in terms of robustness, high thrust, etc. The linear actuator is a screw-nut connection between the rod and the electrical motor system. For the linear actuator, the nut is fixed wherein the rod is mobile.

According to an embodiment of the invention, the screw type linear actuator type can be an actuator using a ball screw or roller screw. In this case, the linear actuator comprises a plurality of rolling elements, that is screws or rollers that are driven by the electrical motor(s) and that drive a threaded part of the screw and conversely. The threaded part of the screw is configured to make the linear actuator reversible. For example, the screw threads of the actuator 3 can have a thread of triangular, trapezoidal or ovoid type, with a helix angle greater than the coefficient of friction. Furthermore, the metal of the screw can be selected with the lowest possible coefficient of friction by having a suitable surface treatment. A continuous lubrication and protective system can also be provided to that end.

Figure 2:
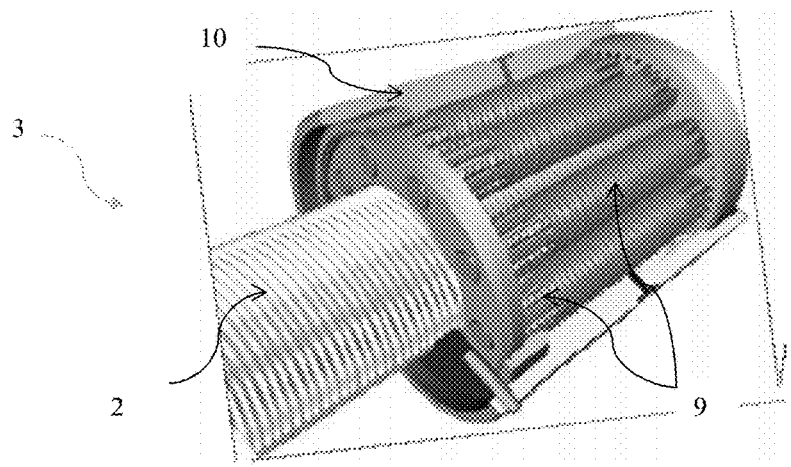
FIG. 2 illustrates a linear actuator of roller screw type according to the invention (illustration from the "roller screw" catalog of SKF®)

FIG. 2 illustrates an example of roller screws that can be used for a linear actuation system according to the invention. FIG. 2 is an illustration from the "roller screws" catalog of the SKF® Company (publication 4351FR-2008-01). Roller screw 3 comprises a threaded rod surrounded by a plurality of rollers 9. The threaded rod and rollers 9 are arranged in a nut 10. The threaded rod of the roller screw corresponds to rod 2 of the linear actuation system. In order to enable the displacement of rod 2, one or more motors drive in rotation rollers 9 that act upon the threaded rod and transmit thereto a linear displacement force. Conversely, when a displacement force is applied to rod 2, the threaded rod drives the rollers in rotation, which in turn drive the electrical motor(s).

Roller screws have a very long service life, can be used for high speeds and accelerations, are precise, reliable and have a higher energy efficiency than hydraulic cylinders. Furthermore, these linear actuators are designed to operate with low friction under the effect of loading. Therefore energy can be recovered during the return path, when a motion is imposed on the threaded rod.

According to an aspect of the invention, the motor/generator can be of universal, synchronous, alternating-current (AC) or direct-current (DC) asynchronous type. The electrical motor(s) can be brushless motor(s). For example, the electrical motor can be an AC asynchronous motor of squirrel cage alternator type. This type of motor/generator is generally very robust and efficient. Furthermore, this type of asynchronous motor is suited for operation as a generator. This type of motor is currently used notably for wind turbines and in hybrid vehicles.

Switching from the "motor" operating mode to the "generator" operating mode can be done by modifying its operating configuration by a suitable electronic control unit.

According to another operating mode, the linear actuator can be equipped to operate on a single axis with a motor when the actuator needs to transmit a linear displacement force, and to operate as a generator when the actuator operates in the opposite direction. Switching from motor to generator operation can for example be done through a dual clutch operated by an electronic control unit.

The electrical power supplied to the motor/generator or to the actuator motor can come from the energy storage and/or from another energy source, notably a power distribution network. In order to supply the AC type electrical motor from the energy storage, a DC/AC power converter (inverter) is integrated between the electrical motor and the electrical energy storage. In cases where the electrical motor used is of DC type, it can be directly supplied from the energy storage, through by a DC/DC converter. If the energy is provided by a power distribution network, an AC/DC converter is integrated between the motor and the network.

Similarly, in generator operating mode of the AC electrical motor, an AC/DC converter is integrated between the energy storage and the electrical motor. If the motor/generator operates on direct current, a DC/DC converter is integrated between the electrical motor and the energy storage.

According to an aspect of the invention, the energy storage can be an electrical energy or mechanical energy storage. In the first case, the electrical energy storage can comprise electrical batteries and/or supercapacitors. In the second case, the mechanical energy storage can comprise flywheels. The energy storage can be combined to provide advantages based on the strong points of each one. The batteries can be used as basic suppliers of the system and they can be supported, in case of momentary power demands, by supercapacitors or flywheels.

The batteries store energy in electrochemical form. The batteries use redox reactions between two electrodes through an electrolyte. Their characteristics provide significant stored reversible energy. Various types of batteries can be used for the system according to the invention: lead-acid, lithium-ion (preferably), lithium-polymer, nickel-metal hydride, redox flow or sodium-sulfur batteries, etc.

The supercapacitors store the energy using an electrochemical double layer principle and an electrolyte. They can release or charge the energy within a very short period of time, thus allowing significant powers to be obtained. Their service life can reach several hundred thousands or millions of cycles when they are properly used. Furthermore, the efficiency of supercapacitors is high on the order of 95%.

Flywheels store energy in kinetic form. Their power and energy characteristics are close to those of supercapacitors. The flywheel can be made of composite materials or steel. The flywheel comprises a rotational energy recovery system, an electromagnetic axis suspension. Flywheels have an almost infinite service life.

Energy management can be provided by a control system. According to the operating mode selected (motor or generator), the actuators can charge the energy storage (batteries, supercapacitors, flywheels, etc.) or discharge storage device through power demands.

During the charging phase, the control system can be programmed to continuously measure the charging parameters (voltage and intensity) of the storage, then to calculate the control parameters such as the available power, the energy capacity, the reaction time, the efficiency, etc. If the energy capacity of the storage is not utilized, the energy provided by the actuators can be stored. In the opposite case, the energy can be sent to a secondary power network (electrical power distribution network), provided that the latter is not overloaded. If the power network does not accept this energy, it can be diverted to a dissipation device or to another energy storage system.

During the discharge phase, the supervision system can instruct continuous measurement of the discharge parameters (voltage and intensity) of the storage, then calculate the control parameters such as the energy/power ratio, the reaction time, the efficiency, etc. If the energy capacity of the storage is sufficient, the energy can be supplied to the actuators directly through an electronic power unit.

In the opposite case, the energy required for recharging the storage unit or for feeding the actuators is taken from the power distribution network, provided that the latter can provide the required energy.

All these actions can be controlled from programmable automatons and control loops operated from a PC type computer.

By comparison with a hydraulic actuation system, the electrical linear actuator with a motor has larger dimensions than the hydraulic cylinder alone. However, the hydraulic actuation system also comprises an electrical motor-hydraulic pump-oil tank assembly, and this assembly is replaced for the electrical actuation system by simple electrical cables leading to a significant final gain in volume and weight.

According to a preferred embodiment of the invention, the linear actuator is a roller screw driven by one or more AC asynchronous electrical motors, the electrical motors are connected to supercapacitors for electrical energy storage by AC/DC converters. This design of the linear actuation system allows an optimized energy efficiency, reduced size and weight, and has good performance.

The invention also relates to a heave compensator equipped with at least one linear actuation system according to the invention. The heave compensator allows drill bits to be kept under constant tension during offshore drilling operations. Indeed, waves cause, among other things, heave, which is a vertical translational oscillatory motion of floating units. When the latter support tools such as drill bits, it is necessary to compensate for the heave so that the bit is permanently in contact with the bottom of the hole.

For example, the invention can apply to the compensation system described in French patent application 2,575,452 which corresponds to U.S. Pat. No. 5,520,369. This patent describes a device comprising two blocks, at least one compensation cylinder connected to accumulators, a cable and two articulated arms that include sheaves and rods allowing compensation for a motion for an element hanging from a mobile unit. However, the heave compensator described in this patent application requires, due to the use of hydraulic cylinders and bulky and heavy accumulators.

The heave compensator according to the invention comprises;
- a first block, also referred to as crown block, equipped with at least one sheave,
- a second block, also referred to as travelling block, from which the drill bits hang. The second block is equipped with at least one sheave. Preferably, the first and second blocks are vertically aligned,
- an articulated system comprising at least two articulated arms, preferably two or four, arranged symmetrically. The articulated arms connect the mobile unit to the first block, and each articulated arm comprises at least one sheave,
- a cable fastened by retention to the mobile unit and running through the sheaves of the articulated arms and of the first and second blocks. The cable forms at least one loop around the first and second blocks; the cable retainer on the mobile unit can comprise at least one winch allowing the cable length to be adjusted, and a linear actuation system as described above, with one end being connected to the first block and the other end being connected to the mobile unit, which notably is a floating platform or a ship.

It should be noted that a block is a mechanical device allowing a load to be lifted by several cable strands.

The heave motion of the mobile unit is largely compensated for by the displacement of the first block with respect to the mobile unit. Thus, the second block is stationary with respect to a fixed reference point, the sea bottom for example. The displacement of the first block is controlled by the linear actuation system and allowed by the articulated system.

Figure 3:
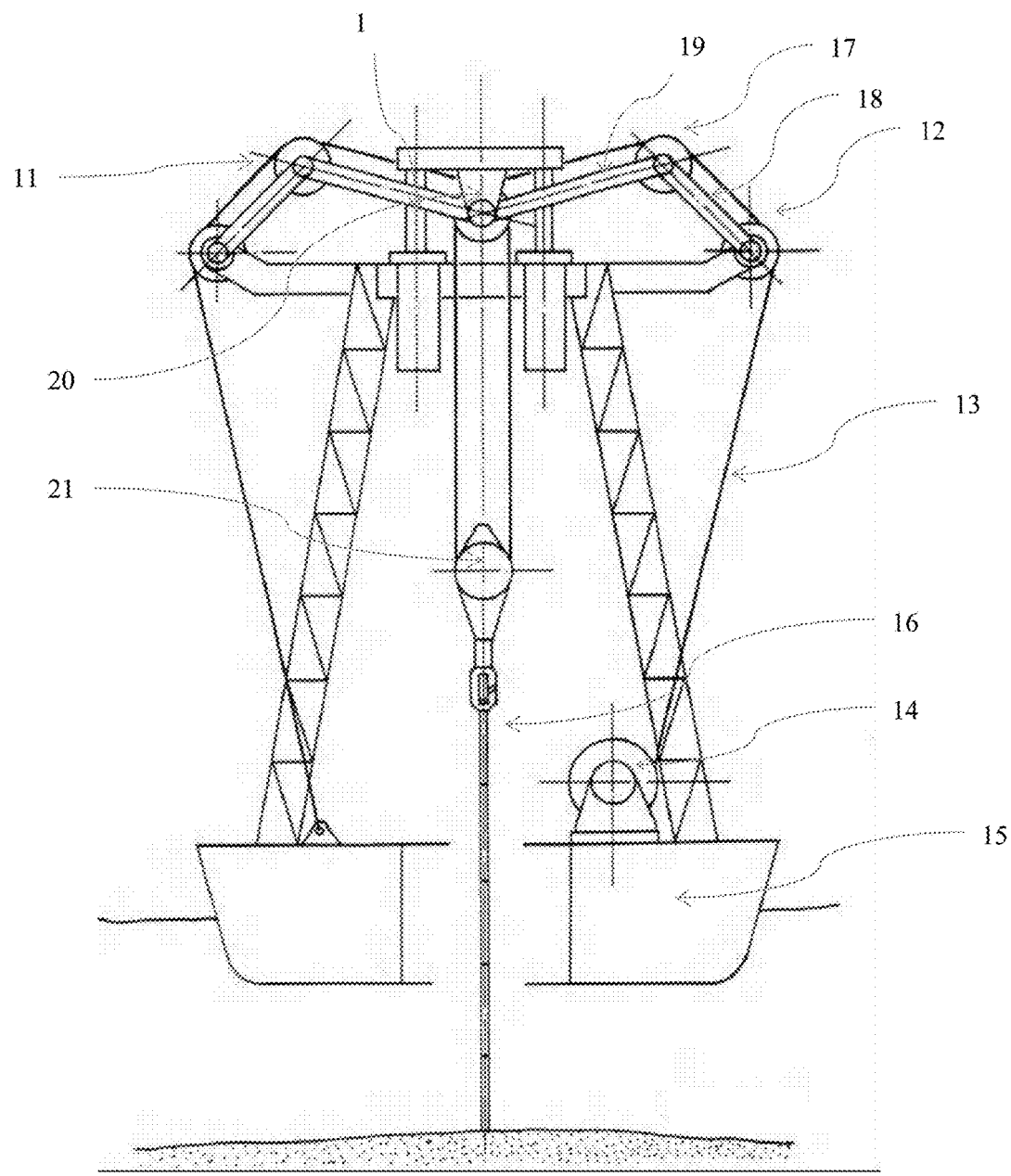
FIG. 3 illustrates a heave compensator according to the invention.

FIG. 3 shows a heave compensator according to an embodiment of the invention. The heave compensator is installed on an offshore mobile unit. The compensation system allows hanging an element 16 (drill bits for example) on a second block 21 by a hook. The heave compensator also comprises a first block 20, two articulated arms 11 connected to a support 15 linked to the mobile unit, two linear actuation systems 1 and a cable 13 fastened to retainer 14. Cable 13 runs through the sheaves of articulated arms 11 and through first and second blocks 20 and 21. As shown, first block 20, second block 21 and the hanging element are vertically aligned, and the heave motion to be compensated for is a vertical motion.

As illustrated by way of non-limitative example, each articulated arm 11 comprises an idler sheave 12 connected to support 15 connected to the mobile unit, an intermediate sheave 17, a first link 18 between idler sheave 12 and intermediate sheave 17, and a second link 19 between intermediate sheave 17 and first block 8.

When the sea level is low, the rods of linear actuation systems 1 are completely extended and first block 20 is far from the level of mobile unit 15. In this position, the electrical motor(s) of linear actuation systems 1 are supplied by the energy storage or by a power distribution network.

Conversely, when the sea level rises, the rods of the linear actuation systems are completely retracted and first block 20 is close to the level of mobile unit 15. In this position, the electrical motor(s) of linear actuation systems 1 provide energy that is stored in the energy storage.

In this case, in relation to the prior art of hydraulic cylinders with their oleopneumatic reserves, the bulky and complex fluid circulation systems are eliminated, and hydraulic leakage problems are avoided. Furthermore, the gain in mass and in volume linked with the replacement of the oleopneumatic reserves by supercapacitors for example can be very significant, close to one order of magnitude in the most favorable cases, which has significant repercussions on the overall size of the platform.

For this application of the linear actuation system to the heave compensator, the linear actuation system can preferably comprise a roller screw, several AC asynchronous motors and supercapacitors. This design of the linear actuation system allows obtaining an optimized efficiency, reduced size and weight of the actuation system, which allows simplification of the design of the mobile unit on which the heave compensator is installed.

A variant of this system can be obtained by adding a cylinder coupling crown block 20 and travelling block 21, thus allowing the weight on bit to be adjusted more precisely.

The linear actuation system according to the invention can also be directly used without the sheave system described in patent FR-2,575,452 which corresponds to U.S. Pat. No. 5,520,369. In this case, the system alone keeps the load in position.

The linear actuation system according to the invention can also be used in a tensioning system for vertical pipes such as risers providing vertical connection between the sea bottom and the surface on floating drilling or oil production supports.

More generally, the linear actuation system according to the invention can be used in any machine performing alternating displacements under a constant or nearly constant force.

Furthermore, any machine performing displacements with cyclic and repetitive force variations, such as a tensile fatigue testing machine, can be equipped with the system according to the invention. When the machine pulls on the sample, the required electricity is taken from the energy storage and when it reduces the force, the displacement is reversed and the return braking can be produced by the generator that will supply electricity to the storage, thus providing an energy savings.

The invention claimed is:

1. A heave compensator for offshore application comprising:
   a first mobile block which moves relative to a second block, the second block having a position relative to a mobile unit and which is configured to hang a load, the first block being moveable relative to the second block in response to heave of the mobile unit;
   at least two articulated arms, each arm comprising at least one sheave;
   a cable attached to a retainer, the cable running from the retainer through the sheaves of the articulated arms and through the first and the second blocks;
   a linear actuator connected to the first mobile block and to the mobile unit for moving the first block relative to the second block to maintain the position, the linear actuator including a rotatable threaded rod which upon rotation translates the rod linearly to move the first mobile block relative to the second block; and
   a system including an energy storage, the system driving a shaft which rotates the rotatable threaded rod, the system in response to the heave of the mobile unit charging the energy storage by rotation of the threaded rod and the shaft in response to the heave, the system using the energy stored in the energy storage to rotate the shaft to rotate the rotatable rod of the linear actuator to maintain the position of the block to compensate for heave of the mobile unit and the first mobile block: and wherein
   the load is one of tensioned vertical metal pipes or drill bits operated as part of the offshore application.

2. A compensator as claimed in claim 1, wherein the linear actuator comprises rollers or balls driven by a motor of the system which drives the rotatable rod and the shaft.

3. A compensator as claimed in claim 2, wherein:
   the rotatable rod of the linear actuator comprises triangular, trapezoidal or ovoid threads.

4. A compensator as claimed in claim 3, wherein the energy storage comprises an electrical battery or a supercapacitor and the system includes an electrical motor having the shaft which drives the motor.

5. A compensator as claimed in claim 3, wherein the system is connected to an electrical power distribution network.

6. A compensator as claimed in claim 2, wherein the energy storage comprises an electrical battery or a supercapacitor and the system includes an electrical motor having the shaft which drives the motor.

7. A compensator as claimed in claim 6, wherein the system is connected to an electrical power distribution network.

8. A compensator as claimed in claim 2, wherein the system is connected to an electrical power distribution network.

9. A compensator as claimed in claim 2, wherein the mobile unit is a floating support.

10. A compensator as claimed in claim 1, wherein the energy storage comprises an electrical battery or a supercapacitor and the system includes an electrical motor having the shaft which drives the motor.

11. A compensator as claimed in claim 10, wherein the system is connected to an electrical power distribution network.

12. A compensator as claimed in claim 1, wherein the energy storage comprises at least one mechanical energy storage.

13. A compensator as claimed in claim 12, wherein the at least one mechanical storage comprises a flywheel.

14. A compensator as claimed in claim 1, wherein the linear actuator comprises a control and the system is an electrical motor-generator system.

15. A compensator as claimed in claim 14, wherein the system supplies electrical energy into a power distribution network when the electrical motor-generator system operates as a generator and when the energy storage is charged.

16. A compensator as claimed in claim 1, wherein the system is connected to an electrical power distribution network.

17. A compensator as claimed in claim 1, wherein the system is supplied by electricity from an electrical power distribution network when the energy storage is discharged or is not able to supply electrical energy to an electrical motor-generator system.

18. A compensator as claimed in claim 17, wherein the system supplies electrical energy into a power distribution network when the electrical motor-generator system operates as a generator and when the energy storage is charged.

19. A compensator as claimed in claim 1, wherein the mobile unit is a floating support.

\* \* \* \* \*